Patented July 12, 1949

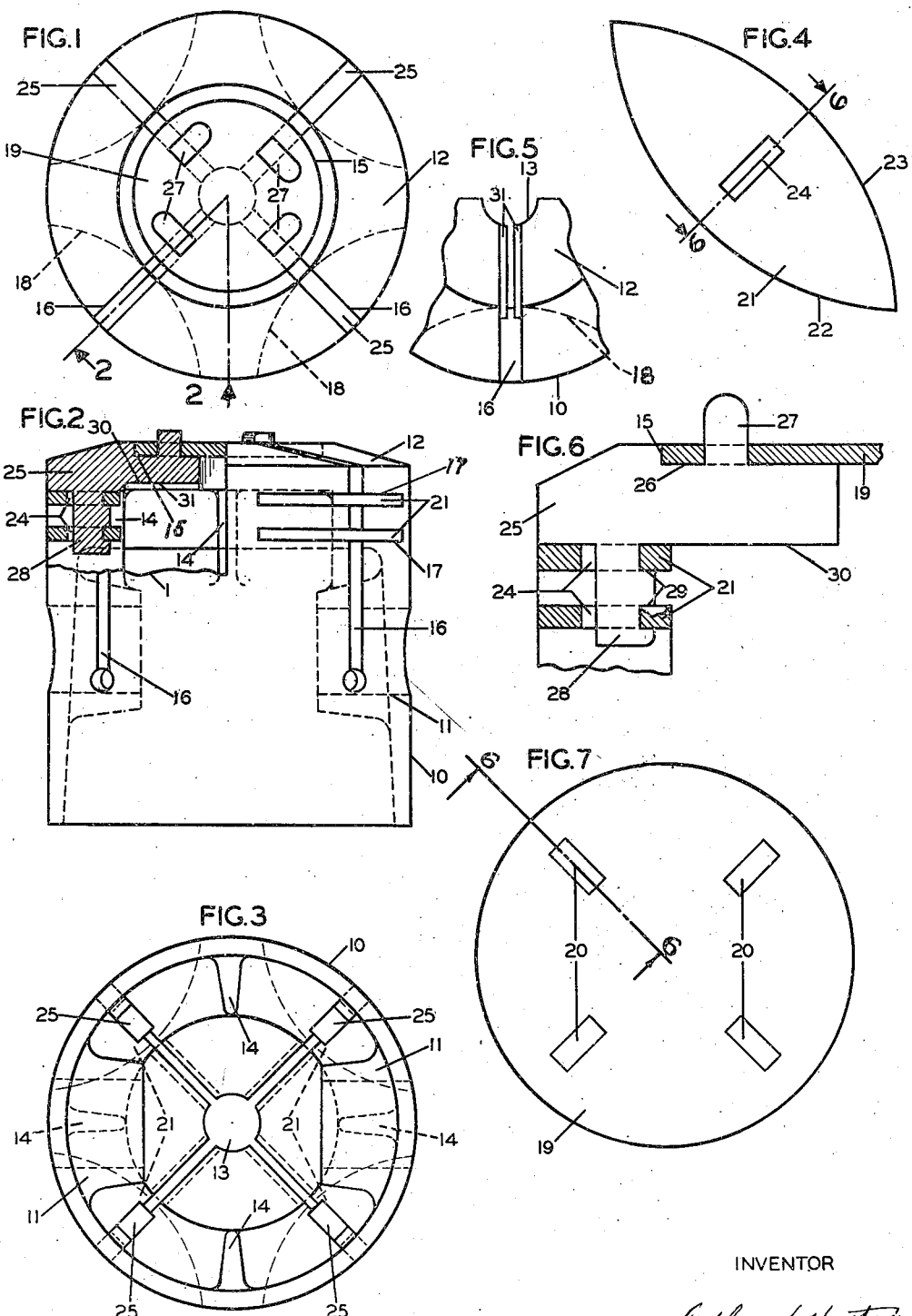

2,476,256

UNITED STATES PATENT OFFICE 2,476,256

COMBUSTION ENGINE PISTON

Stephen D. Hartog, Normandy Township, Mo.

Application January 5, 1948, Serial No. 569

10 Claims. (Cl. 309—10)

This specification, aided by the accompanying drawing, discloses improvements in combustion engine pistons. The invention consists of structural provisions formed in the piston adapted for co-operation with an assembly order of parts and their mode of operation.

In common practice the cylinder engaging slide portion of the piston is provided with a predetermined dimension less than the bore of the cylinder and the rimmed crown head portion is dimensioned proportionately less than the size of the slide portion, the purpose of which is to provide an allowance adequate for the expansion of the piston due to heat, therefore, the slide portion is initially loose in the cylinder, and the rimmed crown head portion being less in size than the slide fails to provide any slidable surface for the piston. A loose fitting piston decreases effective compression, permits the escapage of gas which dilutes the lubricant and the slap, resulting from the loose fit of the piston, induces vibration causing increased wear.

The object therefore of the improvements embodied in the structure of piston as outlined in the drawing, is: To provide a combustion engine piston capable of contactingly engaging the surface of the cylinder slidable over the entire circumferential surface of the piston. To provide a combustion engine piston having the capacity of yielding response under the influence of heat yet capable of maintaining constant an accurate circumferential dimension of the piston. To provide a piston equipped with an assembly order of parts having low thermal conductivity and therefore of low thermal expansion ratio. To provide an assembly order of parts for a combustion engine piston adapted to provide a closure for openings formed in the crown head and slide body of the piston, including heat expansion restraining means and insulation means for the crown portion of the piston.

For the purpose more clearly to understand the expressed objects, and other attending objects, the following description is given, and by aid of the accompanying drawing, it is discernible:

Fig. 1 is a plan view of the piston.

Fig. 2 is a view in elevation having an exposed area as formed above severance line 1 and viewed as of lines 2—2 of Fig. 1.

Fig. 3 is a view of the interior of the piston.

Fig. 4 is an enlarged plan view of an assembly part.

Fig. 5 is a plan view of a fragmentary portion of the crown of the piston.

Fig. 6 is an enlarged view in elevation partly in section of member parts of the assembly and viewed as arrow indicated line 6—6 of Fig. 4 and lines 6—6 of Fig. 7.

Fig. 7 is an enlarged plan view of a disc member of the assembly.

The piston outlined in the drawing comprises a cylinder engaging slide body 10, apertured piston pin bosses 11, a crown 12, an aperture 13 in the crown and strength re-inforcement ribs 14 formed within the piston. The crown 12 is provided with a counter-sunk surface 15, and in order to create the requisite yieldable capacity particularly within the region of the crown of the piston, a series of slits 16 are formed through the crown 12 extending axially lengthwise part way through the slide body 10, and within the perimeter of the slide body spaced marginally from the surface of the crown 12, a plurality of slots 17 are formed in a horizontal plan relative to the lengthwise axis of the piston, the slots 17 extending radially inward from the perimeter terminating in the provision of arcuately formed surfaces 18.

Adapted for assembly and proper arrangement with the piston as formed is an assembly order of parts comprising a disc 19 having a series of apertures 20, plates 21 having arcuately formed surfaces 22 and 23 including aperture 24, and plates more properly termed, closure-bars, 25. The closure bars 25 are provided with an off-set form 26, projecting tabs 27 and a rectangular projecting portion 28 having notches 29. The assembly is made, preferably, of a metallic composition having low thermal conductivity and consequently low expansion ratio.

The assembly thus formed is adapted for arrangement within the region of the crown portion of the piston by way of entering the portion 28 of the closure-bar 25 into the aperture 24 of plate 21, seating the plate 21 into the notch 29 thereby forming a mortise joint for the couple. The assembly is shown with two plates 21 at Fig. 6 in assembly with the closure bars 25, although one plate 21 would be sufficient. The closure-bars 25 are then entered into the slits 16 by way of seating the closure-bars 25 so that the surface 30 thereof rests upon the surfaces of the ledges 31, indicated at Fig. 5, the closure bars then being slid radially inward thereby entering the plate 21 into the slot 17 so that the arcuate surface 23 of the plate 21 contacts the arcuate surface 18 formed within the slot 17 The assembly and arrangement thus being completed for the piston, the disc 19 is then arranged so that the projecting tabs 27 enter into the apertures 20 of the disc 19 as the disc enters the countersunk form 15 in the crown, the projecting tabs 27 are then bent to secure the assembly in locked engagement with the piston.

Obviously, the slits 16 as formed in the piston divide the crown and the slide body in portions having a yielding capacity radially on axes localized within the zone at which the slits terminate in the slide body, the capacity of resilience to which the portions respond yieldingly is measured by the axially lengthwise depth given the slits 16. The closure-bars 25 are incapable of dislocation perpendicularly, being secured by means of the plates 21 within the slots 17 and the mortise joint formed by the engagement of the plate as seated in the notches 29. The arcuate surfaces 23 of the plates 21 are formed to contact bindingly on the arcuate surfaces 18 formed within the slots 17. Consequently, the yieldability of the portion of the crown and the slide body and their expansion under the influence of heat is subject to the restraint provided by the disc 19 and the projecting tabs 27 which projecting tabs fit snugly within the apertures 20 formed in the disc 19. Expansion inevitably takes place in the yieldable portion of the piston but their expansion is interruptedly delayed owing to the low thermal conductivity of the assembly, during the interim the cylinder is expanded measurable equal to the low thermal expansion of the assembly. The slits 16 divide the crown and a major portion of the slide body in segments, the slits being in crisscross form, each portion between the slits forming a segment having radial yieldability.

The form and arrangement of the members of the assembly provide an anchor. The disc 19 and the projecting tabs 27 providing the stock, closure-bars 25 the shank, the plate 21, the flukes, and their functional performance is; to anchor the arcuate surface of the counter-sunk form 15 to the perimeters of the disc 19. A closure for the openings 16 is provided by the disc 19 which also is heat insulating, the closure-bars 25 provide insulating means for each segment and a closure for the openings, the plates 21 provide sealing and insulating means.

The assembly of parts are arranged in association with the piston at a position of maximum lever effectiveness on the crown head whereby effective control of the yieldable segments is most powerful.

Having thus described the invention, it is obvious that there is provided a combustion engine piston of the character described and possessed of the advantageous features expressed as desirable. It is therefore to be understood that the piston is susceptible of modification in its form, proportions, detailed construction and arrangement of parts without departing from the principle involved or sacrificing any of its advantages.

The invention has been described in language more or less specific as to structural features. It is to be understood, however, that the invention is not limited to the specific details shown but that the means and construction herein disclosed comprises the preferred form of several modes of putting the invention into effect and the invention therefore is claimed in any of its forms or modifications within the legitimate and valid scope of the appended claims.

I claim, and desire to secure by Letters Patent of the United States of America, this invention as, in, and for:

1. A combustion engine piston having a slide body, apertured piston pin bosses, and a crown for the slide body, openings formed through the crown, said openings extending part way axially lengthwise through the slide body, said openings dividing the crown and the slide body in portions, and a closure to seal the openings.

2. A combustion engine piston having a slide body, apertured piston pin bosses, and a crown for the slide body, openings formed in the crown and in the slide body, said openings dividing the crown and the slide body in portions forming segments, said segments having a yielding capacity, and a closure to seal the openings.

3. A combustion engine piston having a slide body, apertured piston pin bosses, and a crown for the slide body, criss-cross slits formed through the crown, said slits extending part way axially lengthwise through the slide body, said slits dividing the crown and the slide body in portions forming segments, said segments having a yielding capacity, and a closure to seal the slits.

4. A combustion engine piston; said piston comprising a slide body having apertured piston pin bosses, a crown for said slide body, horizontal slots formed in the slide body, said slots terminating in arcuately formed surfaces, crisscross slits cut through said crown and extending part way axially lengthwise through the slide body, said slits dividing the crown and the slide body in portions forming segments, said segments having a yielding capacity, and a closure to seal the slits.

5. A combustion engine piston, said piston comprising a crown head and a cylinder engaging slide body having apertured piston pin bosses, slits cut through said crown, said slits extending part way axially lengthwise through the slide body, said slits dividing the crown and the slide body in portions forming segments, said segments having the capacity to yield radially on axes localized within the zone at which the slits terminate in the slide body, and a closure for the slits.

6. A combustion engine piston, said piston comprising a crown head and a cylinder engaging slide body provided with apertured piston pin bosses, horizontal slots extending radially inward the slide body, crisscross slits cut through said crown, said slits extending part way axially lengthwise through the slide body, said slits dividing the crown and the slide body in portions, said portions having the capacity to yield radially on axes localized within the zone at which the slits terminate in the slide body, closure-bars within said slits, and plates engaged to the closure-bars.

7. A combustion engine piston, as a piston of the class described, comprising a crown head and a cylinder engaging slide body provided with piston pin bosses, slits cut through the crown head, said slits extending part way axially lengthwise through the slide body, said slits dividing the crown and the slide in portions having the capacity to yield radially on axes localized within the zone at which the slits terminate in the slide body, closure-bars arranged within said slits, plates engaged with the closure-bars, a disc engaged with the closure-bars, and means on said bars to clamp said disc to said bars.

8. A combustion engine piston, as a piston of the class described, comprising a crown head and a cylinder slide body provided with apertured piston pin bosses, a surface of counter-sunk form in said crown head, slits cut through said crown head, said slits extending part way axially lengthwise through the slide body, said slits dividing the crown and the slide body in portions, said portions capacitated to yield radially on axes localized within the zone at which the slits terminate in the slide body, closure-bars arranged in said slits, horizontal slots formed in said slide body, a disc in assembly with said closure-bars, plates in assembly with said bars, said disc, said plates and said closure-bars adapted to provide sealing means for said slits, and means on said closure bars adapted to clamp said disc and said plates in mutual engagement.

9. A combustion engine piston having a crown head and a cylinder slide body provided with apertured piston pin bosses, a counter-sunk surface formed in the crown head of said piston, openings formed through said crown head, ledges within said opening, said openings extending part way axially lengthwise through the slide body, closure-bars arranged within said openings, said closure-bars seated on said ledges, said closure-bars having an engagement with plates, said closure-bars having engagement with a disc, and means on said closure-bars adapted to secure said disc to the closure-bars.

10. A combustion engine piston, said piston comprising a crown head and cylinder slide body provided with apertured piston pin bosses, crisscross slits cut through the crown head, said slits extending part way axially lengthwise through the slide body, closure-bars arranged within said slits, notches formed in said closure-bars, projecting tabs formed on the closure-bars, and a disc secured to the closure-bars by means of said tabs.

STEPHEN D. HARTOG.

No references cited